United States Patent
Takada et al.

(10) Patent No.: US 8,142,084 B2
(45) Date of Patent: Mar. 27, 2012

(54) METHOD FOR MANUFACTURE OF DOME COVER, DOME COVER, AND DOME-TYPE CAMERA

(75) Inventors: Noboru Takada, Kanagawa (JP); Gentarou Irisawa, Kanagawa (JP)

(73) Assignee: Panasonic Corporation, Osaka (JP)

( * ) Notice: Subject to any disclaimer, the term of this patent is extended or adjusted under 35 U.S.C. 154(b) by 929 days.

(21) Appl. No.: 12/096,038

(22) PCT Filed: Dec. 13, 2006

(86) PCT No.: PCT/JP2006/324837
§ 371 (c)(1),
(2), (4) Date: Jun. 4, 2008

(87) PCT Pub. No.: WO2007/069641
PCT Pub. Date: Jun. 21, 2007

(65) Prior Publication Data
US 2009/0310956 A1    Dec. 17, 2009

(30) Foreign Application Priority Data
Dec. 14, 2005    (JP) ................................. 2005-360508

(51) Int. Cl.
G03B 17/00    (2006.01)
B28B 5/00    (2006.01)
B28B 27/08    (2006.01)
B29D 22/00    (2006.01)

(52) U.S. Cl. ........................ 396/427; 264/250; 248/35.7
(58) Field of Classification Search ................... 396/427; 264/250; 428/35.7; 29/425; 451/123
See application file for complete search history.

(56) References Cited

U.S. PATENT DOCUMENTS

| | | | | |
|---|---|---|---|---|
| 5,470,219 A | * | 11/1995 | Yokoyama et al. | ........... 425/144 |
| 5,882,693 A | | 3/1999 | Silkowski et al. | |
| 6,707,619 B1 | * | 3/2004 | Okuno | ........................ 359/694 |

FOREIGN PATENT DOCUMENTS

| | | |
|---|---|---|
| CN | 1428230 A | 7/2003 |
| JP | 5-12107 | 2/1993 |
| JP | 05-345334 | 12/1993 |
| JP | 2001-506199 | 5/2001 |
| JP | 2003-071881 | 3/2003 |
| JP | 2003-285351 | 10/2003 |
| JP | 2005-300659 | 10/2005 |
| JP | 2005-329651 A | 12/2005 |

OTHER PUBLICATIONS

International Search Report Dated Jan. 30, 2007.

* cited by examiner

Primary Examiner — Rochelle-Ann J Blackman
(74) Attorney, Agent, or Firm — Pearne & Gordon LLP

(57) ABSTRACT

A dome cover (6) is manufactured by injection molding by steps of: forming a cavity (14) having the shape of the dome cover (6) between an upper mold (12) and a lower mold (13) for an injection molding die (11), providing a gate port (16) for injecting melt resin at a position (of the upper mold (12)) corresponding to the zenithal portion (15) of the dome cover (6), and injecting the melt resin into the cavity (14) through the gate port (16). The resin injected from the center portion (the portion corresponding to the zenithal portion (15) of the dome cover (6)) of the cavity (14) flows uniformly toward the circumference of the cavity (14). Therefore, variations in pressure and temperature of the resin in the cavity (14) are restrained and, consequently, molding irregularity of the manufactured dome cover (6) is restrained. According to the method of manufacturing the dome cover as described above, generation of the partial molding irregularity on the manufactured dome cover is restrained.

6 Claims, 6 Drawing Sheets

METHOD FOR MANUFACTURE OF DOME COVER, DOME COVER, AND DOME-TYPE CAMERA

TECHNICAL FIELD

The present invention relates to a dome cover used for a dome-type surveillance camera or the like.

BACKGROUND ART

Hitherto, a surveillance camera installed on walls or ceilings of facilities is known. Such surveillance camera includes a dome cover for containing and protecting a lens. The dome cover is typically made of transparent resin. The dome cover includes a semi-spherical dome portion which has an opening and a flange portion which is provided with the peripheral edge of the opening. The lens of the surveillance camera rotates in a pan direction or in a tilt direction in a state of being contained in the dome cover. Shooting of surveillance video is carried out through the transparent dome cover. The dome cover is required to have an optically high performance. For example, the dome cover is required to have a performance to provide a high-quality, high-resolution camera image shot therethrough. A dome-type camera as described above is disclosed in JP-A-2005-300659 (pages 4-6, FIG. 2).

The dome cover as described above is manufactured, for example, by injection molding. A cavity which has a shape corresponding to the shape of the dome cover is formed between an upper mold and a lower mold of a metal mold used for the injection molding. The metal mold for injection molding in the prior art has a gate port for injecting resin at a position corresponding to the flange portion of the dome cover so as to prevent a gate trace from being left on the dome portion of the molded dome cover. For example, the gate port is provided with a lateral side of the cavity (a circumference of the substantially circular cavity in plan view). Then, heated and melt resin is injected into the cavity through the gate port of the injection molding die, and the resin is cooled and cured. In this manner, the dome cover is manufactured by the injection molding. Such injection molding die is disclosed, for example, in JP-A-2003-285351 (pages 3-6, FIG. 2).

However, according to the method of manufacturing the dome cover in the prior art, the resin is injected through the gate port provided with the lateral side of the cavity. Therefore, the resin injected from the lateral side of the cavity (one of the circumferences of the substantially circular cavity in plan view) flows around to the center of the cavity (which corresponds to a zenithal portion of the dome cover), and then flows toward an exit portion of the other circumference of the cavity. When the resin flows in the cavity as described above, the flow of the resin is not uniform near the gate port and the exit portion, and the pressure and the temperature of resin in the cavity varies. Therefore, the dome cover manufactured in the method in the prior art, molding irregularity occurs at portions corresponding to the gate port and the exit portion, and hence optical irregularities (lowering of the quality or the resolution of the camera image) may occur.

DISCLOSURE OF INVENTION

Problems to be Solved by the Invention

The present invention is achieved in the background as descried above. It is an object of the present invention to provide a method of manufacturing a dome cover in which occurrence of partially molding irregularity is restrained.

Means for Solving the Problems

One aspect of the present invention is a method of manufacturing a dome cover, which comprises: forming a cavity which has a shape of the dome cover between a first metal mold and a second metal mold for injection molding; providing a gate port for injecting melt resin at a position of the first metal mold corresponding to a zenithal portion of the dome cover; and injecting the melt resin into the cavity through the gate port to manufacture the dome cover by injection molding.

Another aspect of the present invention is a dome cover, which is manufactured by the method of manufacturing a dome cover described above.

Another aspect of the present invention is a dome-type camera, which comprises: the dome cover described above; and a camera provided inside the dome cover.

As described below, there are other aspects of the present invention. Therefore, disclosure of the invention is intended to provide some aspects of the present invention, and is not intended to limit the scope of the invention described and claimed here.

Figure 1:
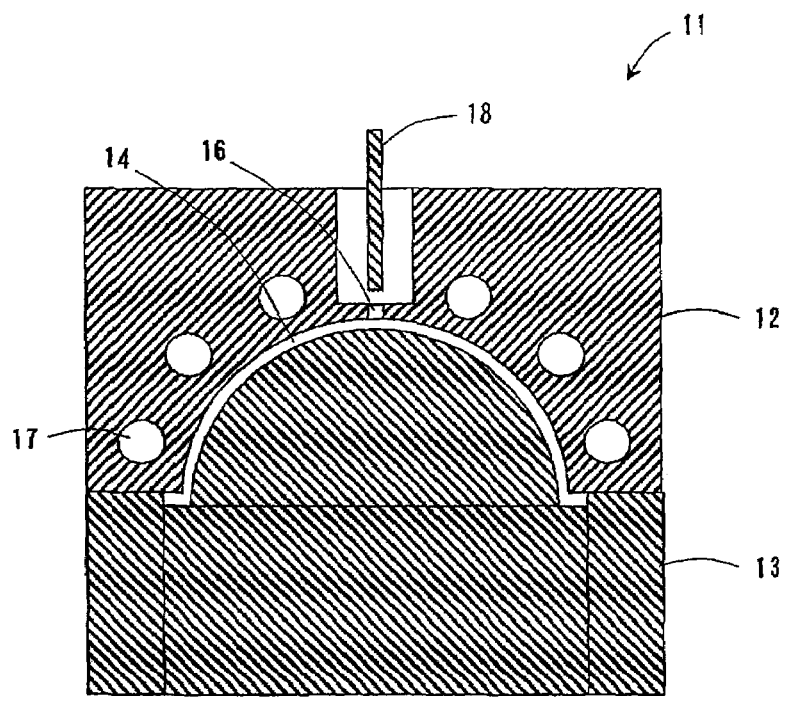
FIG. 1 is a cross-sectional view of a injection molding die (in a state in which a gate pin member is pulled out) for a dome cover in the embodiment of the present invention.

REFERENCE NUMERALS 1 dome-type camera
6 dome cover
11 injection molding die
12 upper mold (first metal mold)
13 lower mold (second metal mold)
14 cavity
15 zenithal portion 16 gate port
17 gate pin member
19 upper mold inner peripheral surface (inner peripheral surface of the first metal mold)
20 pin end surface (distal end surface of the gate pin member)
21 ultrasonic welder apparatus (secondary processing apparatus)
22 horn member
23 distal projection
24 lower surface (contact surface) of the distal projection of the horn member

BEST MODE FOR CARRYING OUT THE INVENTION

Detailed description of the present invention will be described below. However, the detailed description and the attached drawings are not intended to limit the invention. Instead, the scope of the invention is limited by appended claims.

A method of manufacturing a dome cover according to the present invention includes: forming a cavity having a shape of the dome cover between a first metal mold and a second metal mold for injection molding; providing a gate port for injecting melt resin at a position of the first metal mold corresponding to a zenithal portion of the dome cover; and injecting the melt resin into the cavity through the gate port to manufacture the dome cover by injection molding.

According to this method, the resin injected from the center portion of the cavity (the portion of the dome cover corresponding to the zenithal portion) flows uniformly toward the circumference of the cavity. Therefore, occurrence of variations in pressure or in temperature of the resin in the cavity is restrained, and hence molding irregularity of the manufacture is prevented from occurring on the manufactured dome cover.

The method of manufacturing the dome cover in the present invention may include: using a secondary processing apparatus having a mirror-finished contact surface, and pressing the contact surface to the zenithal portion of the dome cover manufactured by injection molding; welding resin at the zenithal portion of the dome cover; and transferring the mirror-like shape of the contact surface of the secondary processing apparatus to the zenithal portion of the dome cover.

The secondary processing can be applied to the zenithal portion of the dome cover by transferring the shape of the mirror-finished contact surface of the secondary processing apparatus to the zenithal portion of the dome cover. For example, if a trace of the gate port (gate trace) is left at the zenithal portion of the dome cover, the gate trace can be shaded out easily by the secondary processing.

The method of manufacturing the dome cover according to the present invention may include melting resin at the zenithal portion of the dome cover by ultrasonically vibrating the contact surface of the secondary processing apparatus.

In this method, the resin at the surface of the zenithal portion of the dome cover melts while ultrasonic vibrations are being applied. Therefore, in comparison with the case in which resin is heated and melted, the degree of melt of the resin can be easily controlled. When the ultrasonic vibrations are stopped, the resin at the zenithal portion of the dome cover is cooled and cured. Therefore, the time required for curing the resin can be short, and hence the time required for the secondary processing can be reduced.

The method of manufacturing the dome cover according to the present invention may include vibrating the contact surface of the secondary processing apparatus along a tangential direction at the zenithal portion of the dome cover.

In this method, the resin at the zenithal portion of the dome cover is easily melted by friction generated between the ultrasonically vibrating contact surface and the zenithal portion of the dome cover.

The method of manufacturing the dome cover according to the present invention, wherein a gate pin member which is removably inserted into the gate port is provided, may include: pulling out the gate pin member to a pulled-position to open the gate port when the resin is injected; and inserting the gate pin member to an inserted-position to close the gate port with the gate pin member, and forming a continuous surface with an inner surface of the first metal mold around the gate port and a distal end surface of the gate pin member after the resin has injected.

In this method, since the gate port positioned at the zenithal portion of the dome cover is closed by the gate pin member and the continuous surface is formed by the distal end surface of the gate pin member after the resin has injected, the gate trace at the zenithal portion of the dome cover can be made smaller.

The dome cover according to the present invention comprises the dome cover manufactured by the manufacturing method described above.

The dome-type camera according to the present invention comprises the dome cover described above and a camera provided inside the dome cover.

In the present invention, by injecting melt resin in the cavity through the gate port provided at the position corresponding to the zenithal portion of the dome cover, it can be prevented to generate the partial molding irregularity on the manufactured dome cover.

Referring now to the drawings, a method of manufacturing the dome cover according to the embodiment of the present invention will be described. In this embodiment, a case of manufacturing the dome cover to be used for a dome-type surveillance camera installed on a ceiling or the like of a facility by injection molding will be exemplified.

Figure 2:
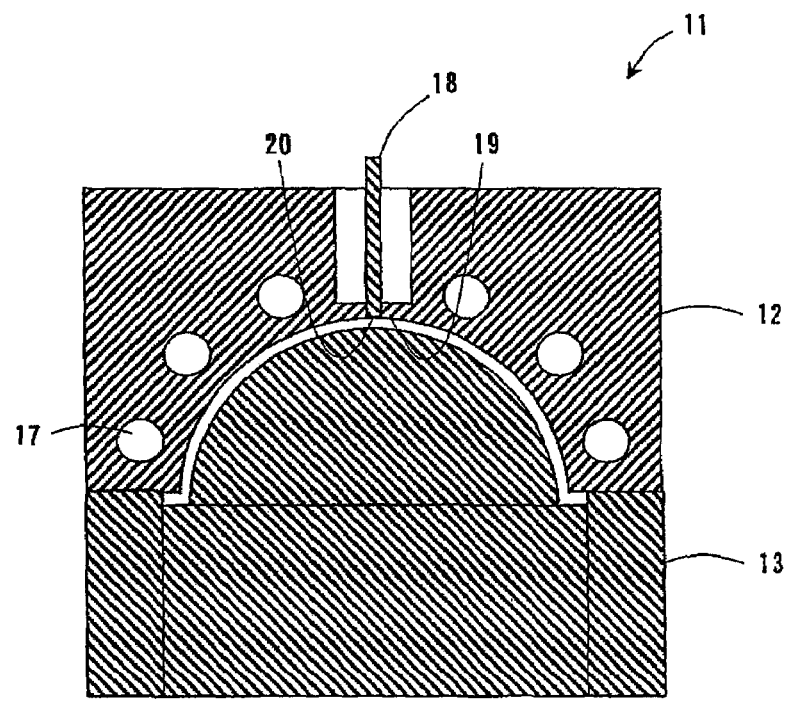
FIG. 2 is a cross-sectional view of the injection molding die (in a state in which the gate pin member is inserted) for the dome cover in the embodiment of the present invention.
Figure 3:
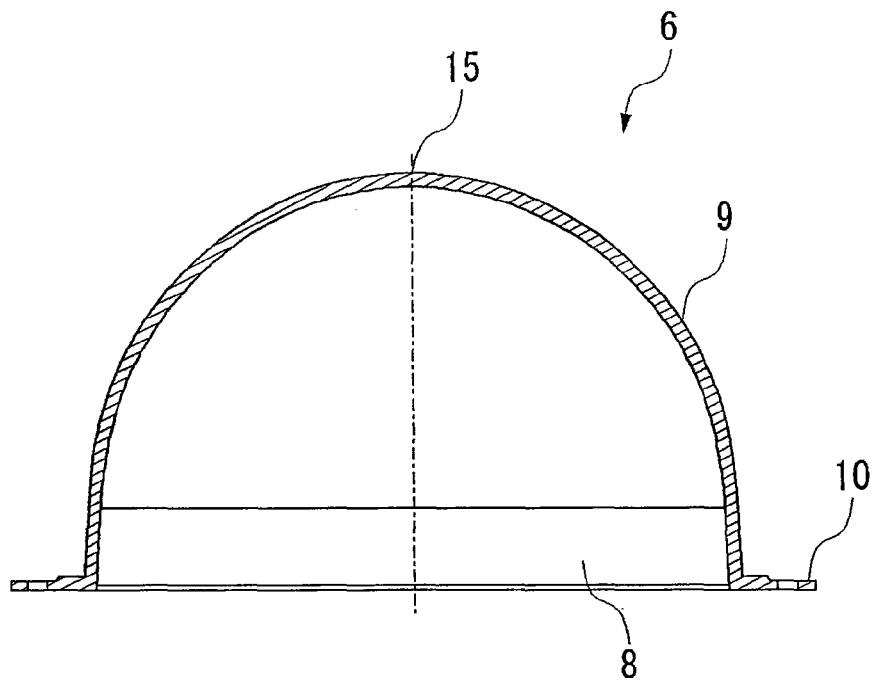
FIG. 3 is a cross-sectional view of the dome cover manufactured according to the embodiment of the present invention.
Figure 4:
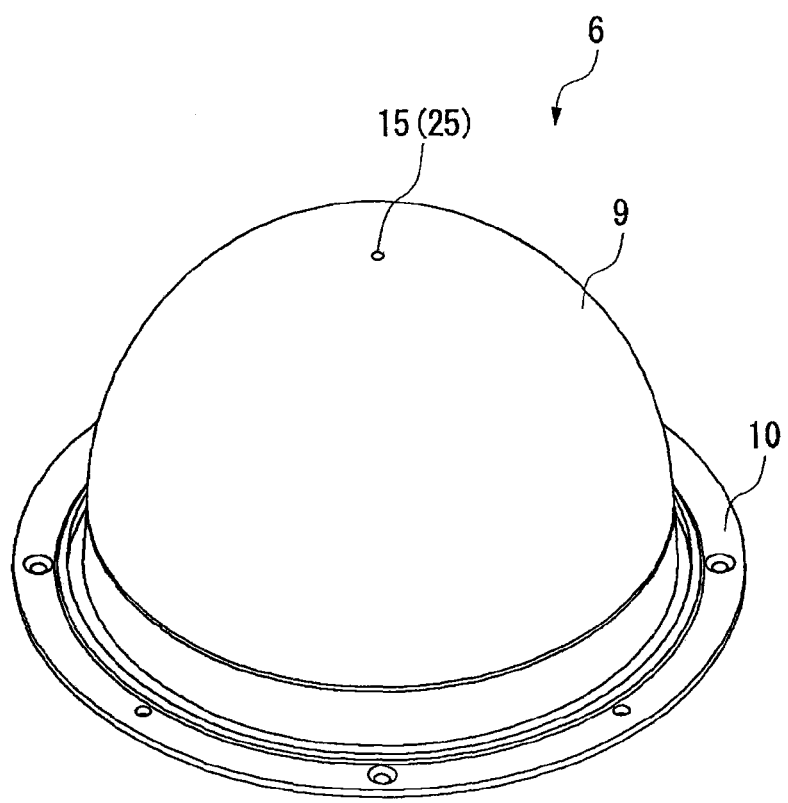
FIG. 4 is a perspective view of the dome cover manufactured according to the embodiment of the present invention.
Figure 5:
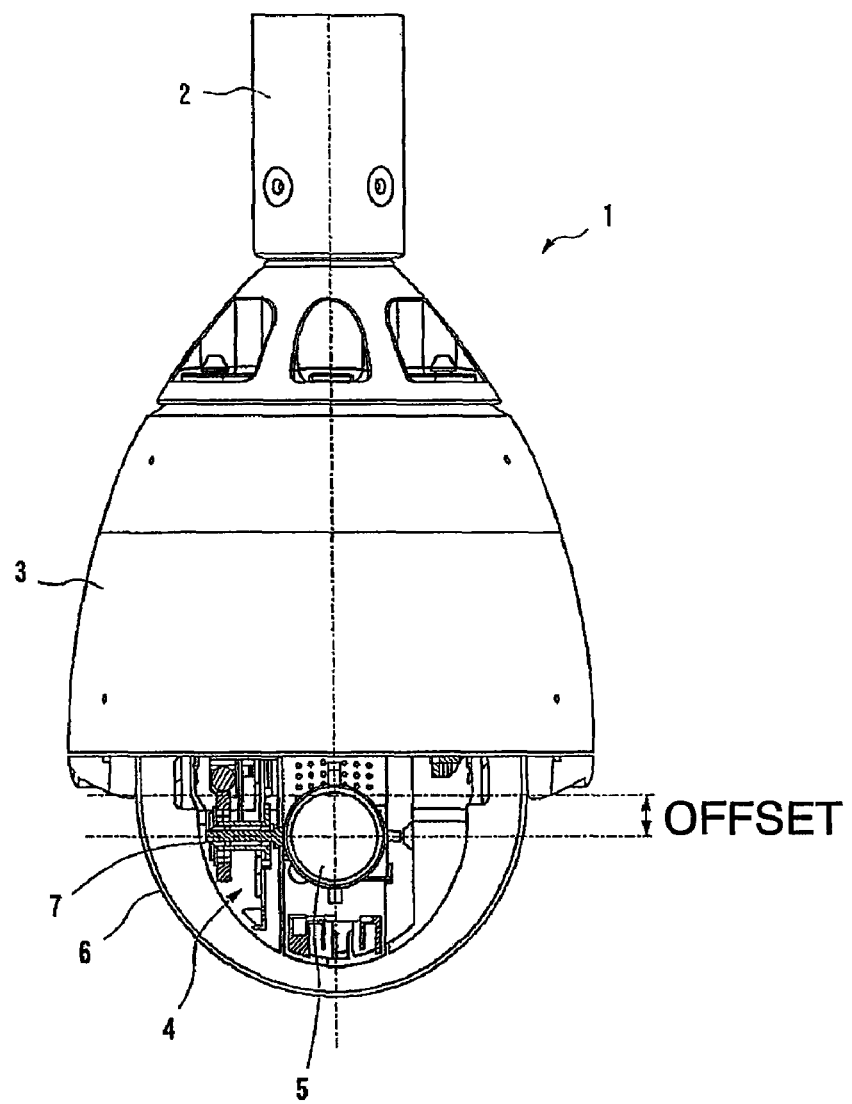
FIG. 5 is a front view of a dome-type camera according to the embodiment of the present invention.

An injection molding die for a dome cover according to the embodiment of the present invention will be shown in FIG. 1 and FIG. 2. FIG. 1 and FIG. 2 are cross-sectional views of the injection molding die viewed from the side. FIG. 3 is a cross-sectional view of the dome cover manufactured by injection molding viewed from the side. FIG. 4 is a perspective view of a dome cover. FIG. 5 is a front view of a dome-type camera provided with the dome cover.

Referring now to FIG. 3 to FIG. 5, configurations of the dome-type camera and the dome cover will be described.

As shown in FIG. 5, a dome-type camera 1 includes a main body 3 having a mounting member 2, a lens 5 of a surveillance camera 4 provided with the lower portion of the main body 3 and a dome cover 6 for containing and protecting the lens 5. The dome-type camera 1 is attached, for example, to a ceiling or the like of a facility by the mounting member 2.

The main body 3 is provided with a pan-tilt mechanism 7 for turning the lens 5 of the surveillance camera 4 in the pan direction (horizontal direction) and the tilt direction (vertical direction). Although it is not specifically shown, the lens 5 includes a plurality of lenses assembled in a lens-barrel. An image sensing device such as CCD is built in the back of the barrel. The surveillance camera 4 is configured in this manner.

The dome cover 6 is attached to the main body 3 in a state of containing the lens 5. As shown in FIG. 3 and FIG. 4, the dome cover 6 includes a substantially semi-spherical dome portion 9 having an opening 8 and a flange portion 10 provided so as to protrude outward from the peripheral edge of the opening 8. In FIG. 3 and FIG. 4, the dome cover 6 having the dome portion 9 of a shape combining a semi-sphere and a cylinder is illustrated as an example. However, the cylindrical portion of the dome portion 9 does not necessarily have to be provided, and the dome portion 9 of the dome cover 6 may be formed into a semi-spherical shape. In FIG. 1 and FIG. 2 described later, illustration of the cylindrical portion of the substantially semi-spherical dome cover 6 is omitted for the sake of simplification of description.

Figure 8:
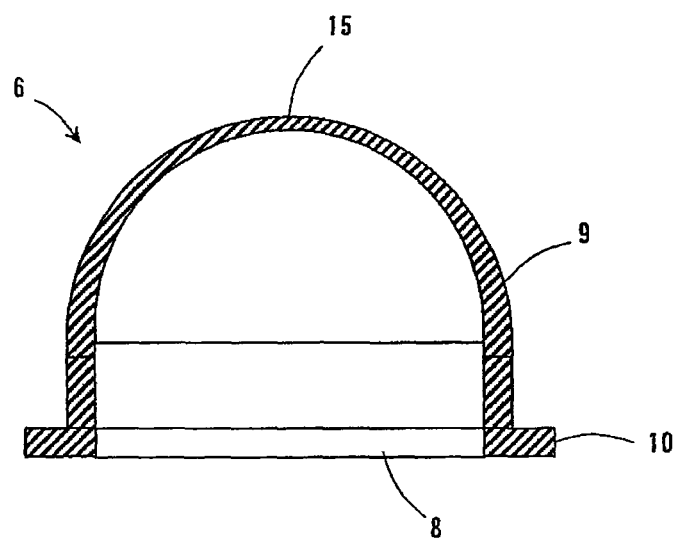
FIG. 8 is an explanatory drawing of a modification of the dome cover in the embodiment of the present invention.

As shown in FIG. 5, in this embodiment, the optical axis of the lens 5 is offset from the center of the semi-sphere of the dome cover 6 toward the zenith of the dome cover 6 in a state in which the lens 5 is directed in the horizontal direction (see FIG. 8). With this offset, the lens 5 is able to shoot the front without being disturbed by the main body 3 (without obstructing the angle of view of the camera by the main body 3) when the lens 5 is directed in the horizontal direction.

The dome cover 6 is made of transparent resin. In this embodiment, transparent synthetic resins such as polycarbonate (PC), acryl, or acrylonitrile butadiene styrene (ABS) are used as the material of the dome cover 6. The dome cover 6 is required to have an optically high performance. For example, the dome cover 6 is required to have a performance to provide a high-quality, high-resolution camera image shot therethrough.

Referring now to FIG. 1 and FIG. 2, a configuration of a molding die 11 used for manufacturing the dome cover 6 by injection molding will be described.

As shown in FIG. 1 and FIG. 2, the injection molding die 11 is provided with an upper mold 12 and a lower mold 13 which are opened and closed upward and downward. A cavity 14 of a substantially semi-spherical shape which corresponds to the shape of the dome cover 6 is formed between the upper mold 12 and the lower mold 13. The upper mold 12 is provided with a gate port 16 for injecting melted resin at a position corresponding to a zenithal portion 15 (topmost portion) of the dome cover 6. The upper mold 12 is also provided with a cooling medium flow channel 17 for allowing cooling medium (cooling water or cooling oil) to flow outside the cavity 14 (at a position corresponding to the periphery of the outer surface of the dome cover 6).

A gate pin member 18 is removably inserted into the gate port 16. The gate pin member 18 is slidable in the vertical direction between the pulled-out position shown in FIG. 1 and the inserted-position shown in FIG. 2. As shown in FIG. 1, in a state in which the gate pin member 18 is pulled to the pulled-out position, the gate port 16 of the upper mold 12 is opened, and hence injection of resin into the cavity 14 through the gate port 16 is enabled. On the other hand, as shown in FIG. 2, in a state in which the gate pin member 18 is inserted to the inserted-position, the gate port 16 of the upper mold 12 is closed by the gate pin member 18, and a continuous surface is formed by an upper mold inner peripheral surface 19 around the gate port 16 and a pin end surface 20 of the gate pin member 18. In other words, as shown in FIG. 2, the upper mold inner peripheral surface 19 around the gate port 16 and the pin end surface 20 of the gate pin member 18 are brought into a continuous state without a level difference.

Here, the upper mold 12 of the injection molding die 11 may be considered to be an outer mold for molding the outside portion of the dome cover 6, and corresponds to a first metal mold in the present invention. The lower mold 13 of the injection molding die 11 may be considered to be an inner mold for molding the inside portion of the dome cover 6, and corresponds to a second metal mold of the present invention.

Figure 6:
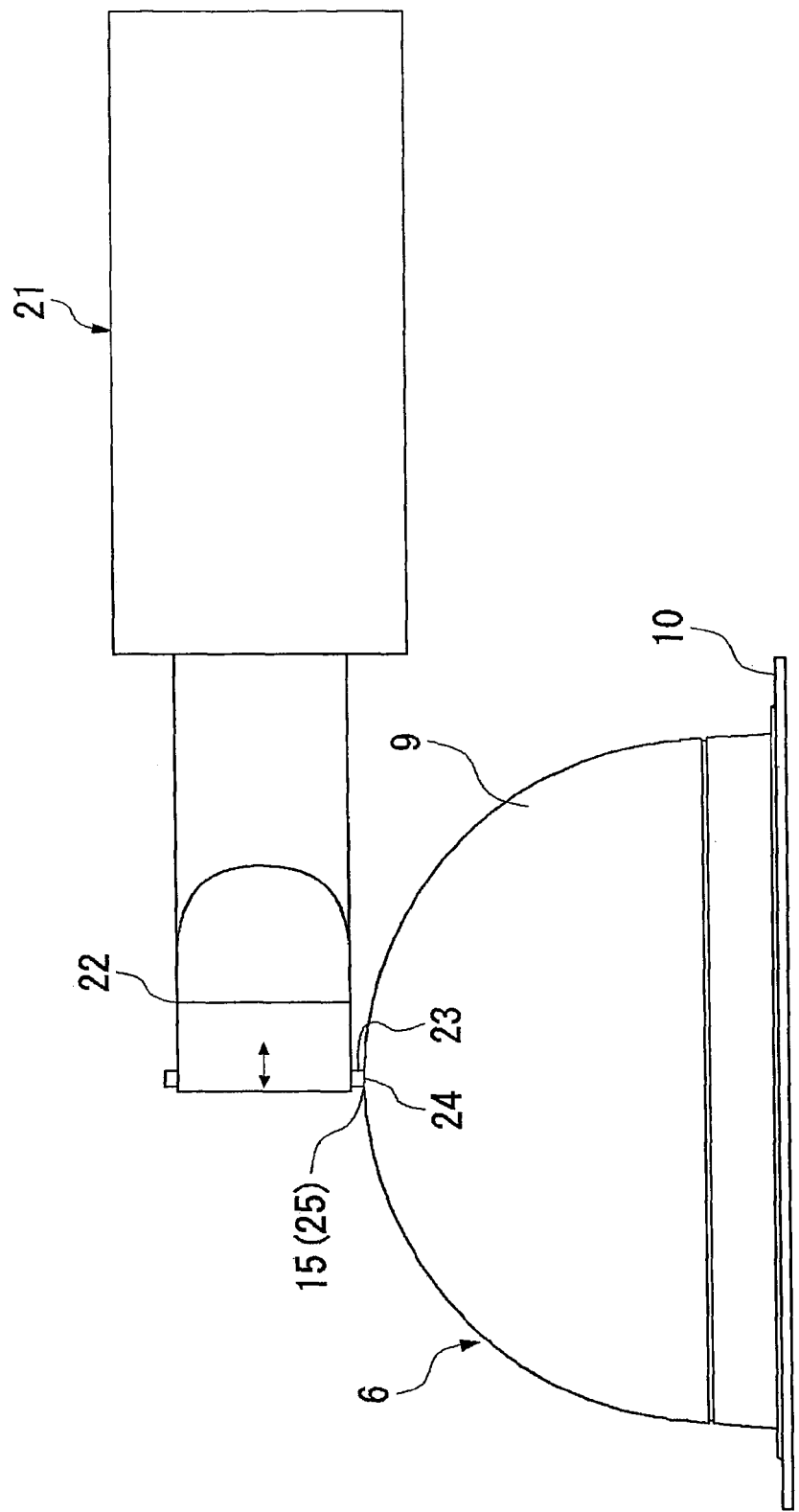
FIG. 6 is a side view showing a state of secondary processing of the dome cover according to the embodiment of the present invention.
Figure 7:
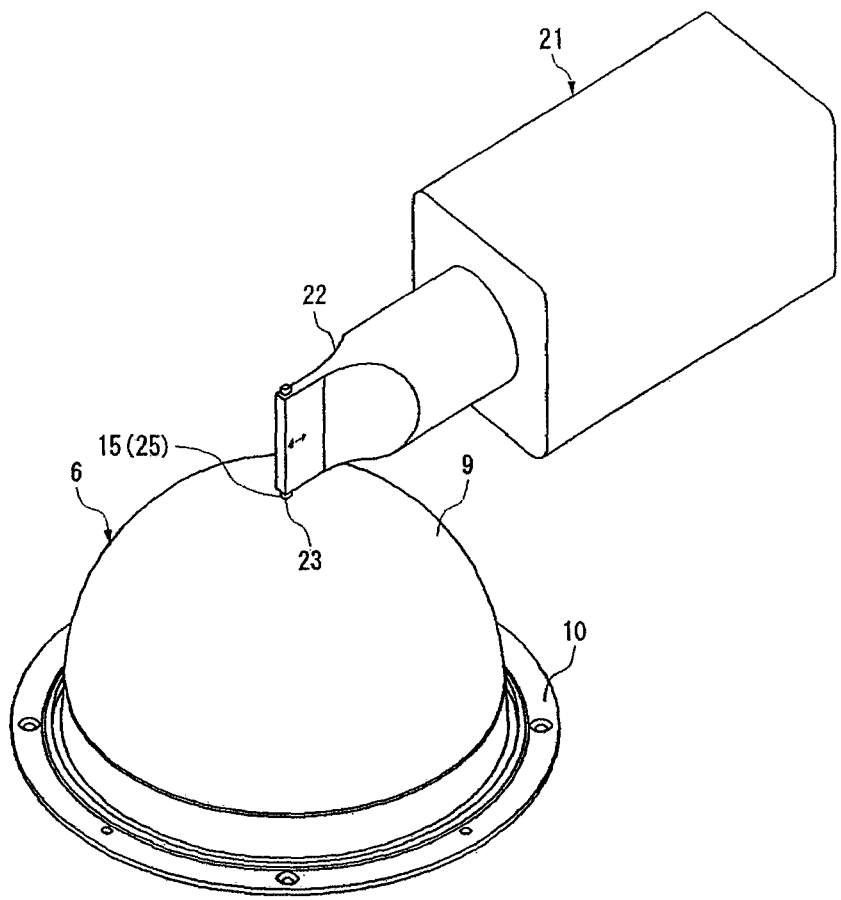
FIG. 7 is a perspective view showing a state of secondary processing of the dome cover according to the embodiment of the present invention.

Referring now to FIG. 6 and FIG. 7, a configuration of an ultrasonic welder apparatus 21 for applying a secondary processing to the dome cover 6 will be described.

FIG. 6 and FIG. 7 show a state of applying the secondary processing to the dome cover 6 manufactured by injection molding. FIG. 6 is a side view showing a state of applying the secondary processing to the zenithal portion 15 of the dome cover 6 and FIG. 7 is a perspective view showing a state of applying the secondary processing to the zenithal portion 15 of the dome cover 6.

As shown in FIG. 6 and FIG. 7, the ultrasonic welder apparatus 21 is used as the secondary processing apparatus for applying the secondary processing to the zenithal portion 15 of the dome cover 6 in this embodiment. The ultrasonic welder apparatus 21 includes an apparatus body, not shown, an ultrasonic transducer provided in the apparatus body for generating ultrasonic vibrations, and a horn member 22 to which the ultrasonic vibrations generated by the ultrasonic transducer is transmitted. In this embodiment, the horn member 22 of the ultrasonic welder apparatus 21 is configured to be vibrated in the horizontal direction (lateral direction in FIG. 6) along a tangential direction (a direction of a tangent line) at the zenithal portion 15 of the dome cover 6.

The horn member 22 of the ultrasonic welder apparatus 21 has a distal projection 23 in a projected shape. A lower surface 24 of the distal projection 23 of the horn member 22 has a spherical shape (recessed spherical shape) extending along the spherical shape (projected spherical shape) of the upper surface of the zenithal portion 15 of the dome cover 6. The lower surface 24 of the distal projection 23 of the horn member 22 is applied with a mirror finishing. Here, the ultrasonic welder apparatus 21 corresponds to the secondary processing apparatus in the present invention, and the lower surface 24 of the distal projection 23 of the horn member 22 corresponds to a contact surface in the present invention.

Referring now to FIG. 1 to FIG. 7, a method of manufacturing the dome cover 6 using the injection molding die 11 and the ultrasonic welder apparatus 21 configured as described above will be described.

When manufacturing the dome cover 6 in the embodiment of the present invention by injection molding, as shown in FIG. 1, the upper mold 12 and the lower mold 13 of the injection molding die 11 are closed to form the cavity 14 between the upper mold 12 and the lower mold 13. Then, the gate pin member 18 is pulled out to the pulled-position to open the gate port 16. Then, melted resin is injected into the cavity 14 through the gate port 16. At this time, the resin injected through the gate port 16 flows from the center portion of the cavity 14 (the portion of the dome cover 6 corresponding to the zenithal portion 15) uniformly and isotropically toward the circumference of the cavity 14.

As shown in FIG. 2, the gate pin member 18 is inserted to the inserted-position to close the gate port 16 with the gate pin member 18. When the resin in the cavity 14 is cooled sufficiently and cured, the upper mold 12 and the lower mold 13 are opened and the dome cover 6 which is a molded product is taken out from the injection molding die 11 (see FIG. 3 and FIG. 4).

Subsequently, when applying the secondary processing to the zenithal portion 15 of the dome cover 6, as shown in FIG. 6 and FIG. 7, the lower surface 24 of the distal projection 23 of the horn member 22 of the ultrasonic welder apparatus 21 is pressed against the zenithal portion 15 of the dome cover 6. Then, as shown by arrows in FIG. 6 and FIG. 7, the horn member 22 of the ultrasonic welder apparatus 21 is vibrated in the horizontal direction (the horizontal direction in FIG. 6) to melt the resin at the zenithal portion 15 of the dome cover 6 again. Then, the mirror-like shape of the lower surface 24 of the distal projection 23 of the pressed horn member 22 is transferred to the zenithal portion 15 of the dome cover 6. Then, generation of ultrasonic vibrations from the ultrasonic welder apparatus 21 is stopped, and the resin at the zenithal portion 15 of the dome cover 6 is cured again.

In this manner, the secondary processing is applied to the zenithal portion 15 of the dome cover 6. With such secondary processing, if a gate trace 25 is formed at the zenithal portion 15 of the dome cover 6, the gate trace 25 may be shaded out.

By using the method of manufacturing the dome cover 6 according to this embodiment as described thus far, for example, a dome cover 6 with thin zenithal portion 15 as shown in FIG. 8 is manufactured easily. According to the dome cover 6 exemplified in FIG. 8, the center of the inner semi-sphere of the dome portion is offset toward the zenithal portion of the dome portion 9 with respect to the center of the semi-sphere of the outside of the dome portion 9. Accordingly, the dome thickness of the zenithal portion 15 of the dome portion 9 (the thickness in the direction vertical to the dome surface) is thinner than the thickness of the dome in the horizontal direction (the thickness of the periphery of the dome portion 9). Accordingly, the optical path difference of the dome portion 9 is reduced and, consequently, the aberration caused by the optical path difference is reduced, thereby improving the image quality of the camera image.

When the dome cover 6 shown in FIG. 8 is manufactured with the manufacturing method of the prior art, since the cavity is narrowed at the zenithal portion of the cavity, when the resin is injected from a position corresponding to the flange portion of the dome cover (the gate port on the lateral side of the cavity), the injected resin may not flow into the zenithal portion of the cavity, and hence the defective molding may occur at the zenithal portion of the cavity. In contrast, with the manufacturing method in this embodiment, since the resin is injected through the gate port 16 positioned at the zenithal portion 15 of the dome cover 6, the injected resin flows smoothly in the cavity 14, and hence occurrence of the defective molding at the zenithal portion 15 of the dome cover 6 is prevented. When the resin is injected through the gate port 16 positioned at the zenithal portion 15 of the dome cover 6, the gate trace 25 may be formed at the zenithal portion 15 of the dome cover 6. However, with the manufacturing method in this embodiment, the gate trace 25 can be shaded out by applying the secondary processing to the zenithal portion 15 of the dome cover 6. Therefore, the method of manufacturing the dome cover 6 in this embodiment is optimal for manufacturing the dome cover 6 having the thin zenithal portion 15 as shown in FIG. 8.

Evaluations of optical performance of the dome cover 6 manufactured in the manner as described thus far were carried out. The evaluation of the optical performance of the dome cover 6 will be described with FIG. 9 and FIG. 10.

Figure 9:
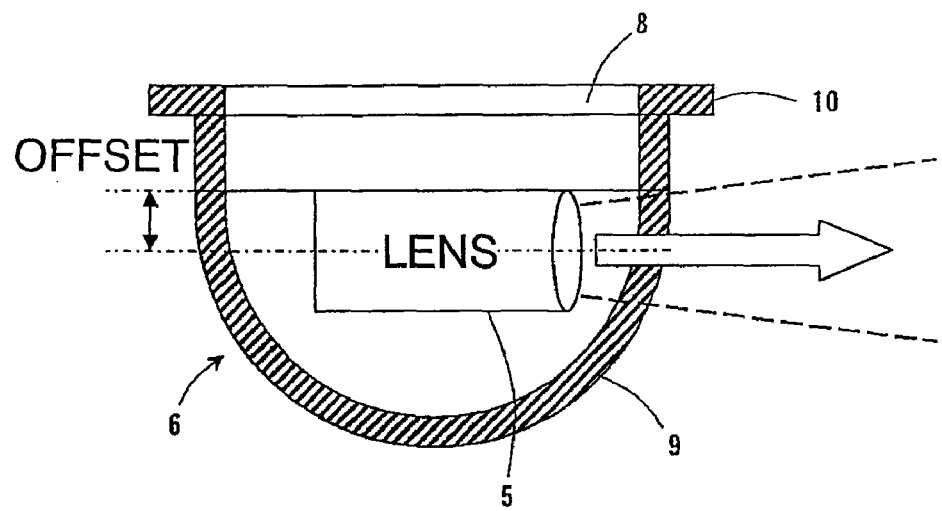
FIG. 9 is a side view for describing a state of shooting with a dome-type camera (the shooting state at the TELE end in the horizontal direction) in the embodiment of the present invention.

First of all, an evaluation of the quality of a camera image shot at the TELE end (the maximum telescopic focal distance of the lens 5) with the lens 5 of the surveillance camera 4 directed in the horizontal direction as shown in FIG. 9 was carried out. Here, a dome cover in the prior art was used as a comparative example. The dome cover 6 in this embodiment was formed by injection molding by injecting resin through the gate port 16 positioned at the zenithal portion 15 of the dome cover 6. In contrast, the dome cover in the comparative example was formed by injection molding by injecting resin from a position corresponding to the flange portion of the dome cover, that is, the gate port on the lateral side of the cavity.

Consequently, in a case in which the camera image was shot with the lens 5 directed in the horizontal direction with the dome cover in the comparative example (the dome cover in the prior art), when the lens 5 is directed toward the gate port or the exit portion on the flange portion, characters shot through the dome portion were blurred to an unreadable state and lowering of the image quality was recognized. In contrast, with the dome cover 6 in this embodiment, the blur of the shot characters was reduced to a readable level irrespective of the direction of the lens 5 in the horizontal direction and improvement of the image quality was recognized. It seems to be because of an effect such that the resin injected from the center portion of the cavity 14 (the portion of the dome cover 6 corresponding to the zenithal portion 15) flows uniformly toward the circumference of the cavity 14 in the dome cover 6 in this embodiment, and variations in pressure or temperature of the resin in the cavity 14 are restrained, whereby the molding irregularity of the manufactured dome cover 6 was restrained.

Figure 10:
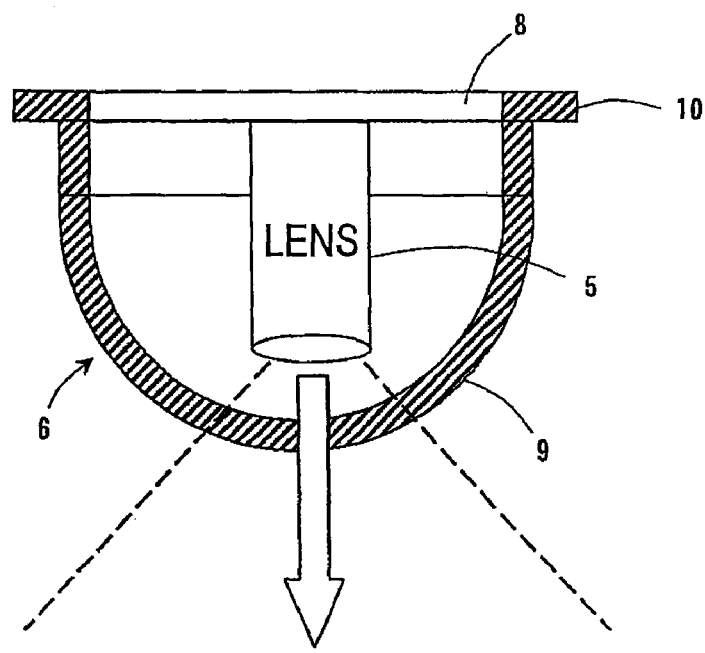
FIG. 10 is a side view for describing the state of shooting with the dome-type camera (the shooting state at the WIDE end in the right downward direction) in the embodiment of the present invention.

Subsequently, an evaluation was carried out on the gate trace 25 to check whether it was visible (eye-catching) or not with a camera image shot through the lens 5 of the surveillance camera 4 at the WIDE end (the widest focal distance of the lens 5) directed right downward (toward the zenith of the dome cover 6) as shown in FIG. 10. In the comparative example, the dome cover which resin was injected through the gate port 16 positioned at the zenithal portion 15 of the dome cover 6 as in this embodiment but the secondary processing was not carried out was used.

As a result, with the dome cover in the comparative example (the dome cover without the secondary processing), a portion of the gate trace 25 at the zenithal portion 15 of the dome cover 6 was not transparent, so that the other side of the gate trace 25 could not see through. In contrast, in the case of the dome cover 6 in this embodiment, the gate trace 25 at the zenithal portion 15 of the dome cover 6 was shaded out and the other side of the gate trace 25 could see through. From this result, an effect that the gate trace 25 is faded out by applying the secondary processing on the zenithal portion 15 of the dome cover 6 was recognized.

According to the method of manufacturing the dome cover 6 in the embodiment of the invention, by injecting melted resin into the cavity 14 through the gate port 16 provided at the position corresponding to the zenithal portion 15 of the dome cover 6, it can be restrained to generate partial molding irregularity on the manufactured dome cover 6.

In other words, in this embodiment, the resin injected from the center portion of the cavity 14 (the portion corresponding to the zenithal portion 15 of the dome cover 6) flows uniformly toward the circumference of the cavity 14. Namely, the resin injected from the center point of the cavity 14 being symmetric with respect to a point flows isotropically (point-symmetrically) toward the portions of the cavity 14 being symmetric with respect to a point. Therefore, occurrence of variations in pressure or temperature of resin in the interior of the cavity 14 can be restrained, and generation of molding irregularity on the manufactured dome cover 6 can be restrained.

In this embodiment, application of the secondary processing to the zenithal portion 15 of the dome cover 6 is achieved by transferring the shape of the mirror-finished contact surface of the secondary processing apparatus to the zenithal portion 15 of the dome cover 6. For example, when the trace of the gate port 16 (gate trace 25) remains on the zenithal portion 15 of the dome cover 6, the gate trace 25 can be shaded out easily by the secondary processing by transferring. For example, the secondary processing by transferring is performed by automating the secondary processing processes with a machine, and hence a high productivity of the dome cover 6 is ensured in comparison with the case of shading out the gate trace 25 of the zenithal portion 15 of the dome cover 6 by the secondary processing by hand polishing.

In this embodiment, the resin on the surface of the zenithal portion 15 of the dome cover 6 is melted while being applied with the ultrasonic vibrations. Therefore, complex temperature control is not necessary and the degree of melt of the resin can be easily controlled in comparison with the case in which resin is heated and melted. When the vibrations caused by the ultrasonic waves are stopped, the resin at the zenithal portion 15 of the dome cover 6 is cooled and cured. Therefore, the time required for curing the resin can be shortened, and hence the time required for the secondary processing can be reduced. For example, when the resin is melted by the ultrasonic vibrations, the time required for melting and curing the resin is on the order of 0.1 seconds. Thus, the time required for the secondary processing can be significantly reduced, and high mass-productivity of the dome cover 6 and the cost down of the dome cover 6 are achieved.

In this embodiment, the contact surface of the secondary processing apparatus is vibrated along the tangential direction at the zenithal portion 15 of the dome cover 6. Accordingly, the resin at the zenithal portion 15 of the dome cover 6 is easily melted by friction generated between the ultrasonically vibrating contact surface and the zenithal portion 15 of the dome cover 6. In this case, since the direction of vibrations of the contact surface is the tangential direction at the zenithal portion 15 of the dome cover 6, the vibration energy generated by the ultrasonic wave can be efficiently converted into friction energy in comparison with the case of vibrating in the direction of a normal line of the zenithal portion 15 of the dome cover 6.

In this embodiment, after the resin has injected, the gate port 16 positioned at the zenithal portion 15 of the dome cover 6 is closed by the gate pin member 18, and the continuous surface is formed by the upper mold inner peripheral surface 19 and the pin end surface 20. Therefore, the gate trace 25 at the zenithal portion 15 of the dome cover 6 can become smaller. In a case in which the gate port 16 is not closed by the gate pin member 18, a column shaped large gate trace 25 may be formed at the zenithal portion 15 of the dome cover 6 with resin remaining in the interior of the gate port 16. In contrast, in this embodiment, the gate trace 25 at the zenithal portion 15 of the dome cover 6 is a small gate trace 25 formed of a circular parting line between the gate port 16 and the gate pin member 18.

Although the embodiment of the present invention has been described by an example, the scope of the present invention is not limited thereto, and modifications and alterations may be made according to the object without departing the scope stated in claims.

For example, the description is given about an example in which the ultrasonic welder apparatus 21 is used as the secondary processing apparatus, and the horn member 22 is ultrasonically vibrated to melt the resin at the zenithal portion 15 of the dome cover 6. However, the scope of the present invention is not limited thereto. For example, the resin at the zenithal portion 15 of the dome cover 6 may be heated and melted.

The preferred embodiment of the present invention which is conceivable at the present moment has been described thus far. However, the fact that various modifications may be made with respect to this embodiment is understood and the fact that such modifications within the sprit and scope of the present invention are included in the appended claims is intended.

INDUSTRIAL APPLICABILITY

As described above, the method of manufacturing the dome cover according to the present invention has an effect such that generation of partial molding irregularity on the manufactured dome cover is restrained, and is effective as a method of manufacturing dome covers used for dome-type surveillance cameras.

The invention claimed is:

1. A method of manufacturing a dome cover comprising:
    forming a cavity which has a shape of the dome cover between a first metal mold and a second metal mold for injection molding;
    providing a gate port for injecting melt resin at a position of the first metal mold corresponding to a zenithal portion of the dome cover;
    injecting the melt resin into the cavity through the gate port to mold the dome cover by injection molding;
    pressing a mirror-finished contact surface of a secondary processing apparatus onto the zenithal portion of the molded dome cover;
    melting resin at the zenithal portion of the molded dome cover; and
    transferring the mirror-like shape of the contact surface of the secondary processing apparatus to the zenithal portion of the molded dome cover.

2. The method of manufacturing a dome cover according to claim 1, wherein:
    the resin at the zenithal portion of the dome cover is melted by ultrasonically vibrating the contact surface of the secondary processing apparatus.

3. The method of manufacturing a dome cover according to claim 2, wherein:
    the contact surface of the secondary processing apparatus is vibrated along a tangential direction at the zenithal portion of the dome cover.

4. A dome cover manufactured by the method of manufacturing a dome cover according to any one of claims 1-3.

5. A dome-type camera comprising: the dome cover according to claim 4; and a camera provided inside the dome cover.

6. A dome-type camera comprising:
    a dome cover which is manufactured by the method of manufacturing a dome cover according to claim 1; and
    a camera provided inside the dome cover.

* * * * *